United States Patent
Patil et al.

(10) Patent No.: US 9,186,948 B2
(45) Date of Patent: Nov. 17, 2015

(54) SYSTEMS AND METHODS FOR DAMPER HAVING AN INSERT

(71) Applicant: GM GLOBAL TECHNOLOGY OPERATIONS LLC, Detroit, MI (US)

(72) Inventors: Ravindra P. Patil, Troy, MI (US); Robert L. Geisler, Grand Blanc, MI (US); Joseph A. Schudt, Macomb, MI (US); Daryl R. Poirier, Davisburg, MI (US); Maolin Tsai, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 87 days.

(21) Appl. No.: 14/098,748

(22) Filed: Dec. 6, 2013

(65) Prior Publication Data

US 2015/0158363 A1 Jun. 11, 2015

(51) Int. Cl.
*F16F 9/58* (2006.01)
*B60G 15/06* (2006.01)
*B60G 11/22* (2006.01)

(52) U.S. Cl.
CPC .............. *B60G 15/06* (2013.01); *B60G 11/22* (2013.01); *B60G 2202/32* (2013.01); *B60G 2204/125* (2013.01); *B60G 2204/4502* (2013.01); *B60G 2204/45021* (2013.01); *F16F 9/58* (2013.01)

(58) Field of Classification Search
CPC .............. F16F 9/58; B60G 2204/125; B60G 2204/45021; B60G 2204/4502; B60G 7/04
USPC ............... 267/292, 293, 294, 220, 140, 140.4
See application file for complete search history.

(56) References Cited

U.S. PATENT DOCUMENTS

| | | | |
|---|---|---|---|
| 1,118,818 A | 11/1914 | Sherman | |
| 1,542,511 A | 6/1925 | Lancia | |
| 2,145,891 A | 2/1939 | Rice, Jr. | |
| 2,917,303 A | 12/1959 | Vierling | |
| 3,111,201 A | 11/1963 | Bliven et al. | |
| 3,582,058 A | 6/1971 | Hodges | |
| 5,308,104 A * | 5/1994 | Charles | 280/124.155 |
| 5,467,970 A * | 11/1995 | Ratu et al. | 267/220 |
| 5,913,391 A | 6/1999 | Jeffries et al. | |
| 6,234,461 B1 | 5/2001 | Bohm et al. | |

(Continued)

FOREIGN PATENT DOCUMENTS

| | | | |
|---|---|---|---|
| DE | 10222940 C1 | 7/2003 | |
| DE | 10236591 A1 * | 2/2004 | B60G 17/04 |

(Continued)

OTHER PUBLICATIONS

Suchta, W., U.S. Appl. No. 14/153,719, filed Jan. 13, 2014.

(Continued)

*Primary Examiner* — Thomas Irvin
(74) *Attorney, Agent, or Firm* — Ingrassia Fisher & Lorenz, P.C.

(57) ABSTRACT

Apparatus are provided for a jounce bumper system for use with a damper. The jounce bumper system includes a first mount and a jounce bumper having a first end coupled to the first mount and a second end. The jounce bumper system includes a flexible striker cap spaced apart from the second end of the jounce bumper in a first position. The flexible striker cap includes a first surface in contact with the second end in a second position and defines a cavity opposite the first surface. The jounce bumper system further includes an insert received within the cavity.

19 Claims, 6 Drawing Sheets

(56) References Cited

U.S. PATENT DOCUMENTS

| | | |
|---|---|---|
| 8,123,203 B2 | 2/2012 | Patil et al. |
| 8,418,821 B2 * | 4/2013 | Henneberg et al. ...... 188/322.12 |
| 9,004,470 B2 * | 4/2015 | Fleniken et al. ............. 267/220 |
| 2003/0209395 A1 | 11/2003 | Fukaya |
| 2004/0178552 A1 * | 9/2004 | Schudt et al. ................. 267/220 |
| 2005/0012256 A1 * | 1/2005 | Huprikar et al. ............. 267/141 |
| 2006/0043659 A1 | 3/2006 | Gofron et al. |
| 2006/0131119 A1 | 6/2006 | Ishikawa |
| 2007/0119671 A1 | 5/2007 | Quinn et al. |
| 2008/0179148 A1 | 7/2008 | Quinn et al. |
| 2009/0145707 A1 * | 6/2009 | Henneberg et al. ...... 188/322.12 |
| 2010/0213656 A1 * | 8/2010 | Patil et al. ..................... 267/220 |
| 2010/0230877 A1 | 9/2010 | Schudt et al. |
| 2013/0234377 A1 | 9/2013 | Leonard |
| 2013/0307204 A1 * | 11/2013 | Patil et al. ..................... 267/220 |
| 2013/0328255 A1 * | 12/2013 | Geisler et al. ................. 267/220 |
| 2014/0175722 A1 * | 6/2014 | Baek ............................. 267/220 |
| 2014/0239567 A1 * | 8/2014 | Suchta et al. ................. 267/220 |
| 2014/0252707 A1 * | 9/2014 | Fleniken et al. ............. 267/220 |
| 2015/0008627 A1 | 1/2015 | Leonard |
| 2015/0076784 A1 * | 3/2015 | Al-Dahhan ............ 280/124.177 |

FOREIGN PATENT DOCUMENTS

| | | |
|---|---|---|
| DE | 10351840 A1 | 6/2004 |
| WO | 03008215 A1 | 1/2003 |

OTHER PUBLICATIONS

USPTO, Office Action for U.S. Appl. No. 14/153,719, mailed on Mar. 27, 2015.

USPTO, Office Action in U.S. Appl. No. 14/153,719 mailed May 15, 2015.

German Patent and Trade Mark Office, Office Action for German Patent Application No. 10 2014 202 989.9 mailed Jun. 3, 2015.

* cited by examiner

US 9,186,948 B2

SYSTEMS AND METHODS FOR DAMPER HAVING AN INSERT

TECHNICAL FIELD

The present disclosure generally relates to suspension systems for a vehicle and more particularly relates to systems and methods for a damper having an insert for use with a suspension system of a vehicle.

BACKGROUND

Vehicles are typically equipped with suspension systems that include components that contract and expand to provide flexible relative movement between the body and chassis. During normal driving conditions, these components gradually dissipate the forces generated by bumps, potholes, and other road surface anomalies in a controlled manner that helps the driver to maintain control over the vehicle and provides passengers a comfortable driving environment.

In certain instances, the vehicle may encounter a road surface anomaly that causes the components of the suspension to contract beyond the designed operating range of springs and shocks/struts, which may be referred to as jounce. Thus, many suspension systems employ impact load management systems that limit jounce. Such systems typically include jounce bumper assemblies configured to engage during severe impact events and provide a "bottoming" or a limit to further contractive motion. These assemblies may be used to limit jounce between, for example, sprung and unsprung vehicle masses and may be conveniently located within the body of a shock or strut. Such integrated assemblies typically include a rigid metallic striker plate coupled to the end cap of the damper tube and a jounce bumper coupled to the upper mount. Each is aligned along a common piston rod and spaced apart so that, during an impact event, the striker cap and jounce bumper engage causing the bumper to deform axially along the piston rod in the direction of loading. However, such a configuration provides little cushioning effect from impact loads because of the rigidity of the striker plate and the marginal capacity of the bumper to absorb associated energy. Accordingly, these and other similarly affected elements including the chassis frame and vehicle body structure are generally designed with a more rugged construction of greater mass and volume than would otherwise be required if the suspension system components were more energy absorbing.

Accordingly, it is desirable to provide systems and methods for a damper having an insert for managing impact load in a vehicular suspension system that enables the use of lighter weight supporting materials without adversely impacting other desirable vehicle characteristics such as driving comfort or vehicle controllability. Furthermore, other desirable features and characteristics of the present invention will become apparent from the subsequent detailed description and the appended claims, taken in conjunction with the accompanying drawings and the foregoing technical field and background.

SUMMARY

In one embodiment, an apparatus is provided for a jounce bumper system for use with a damper. The jounce bumper system includes a first mount and a jounce bumper having a first end coupled to the first mount and a second end. The jounce bumper system includes a flexible striker cap spaced apart from the second end of the jounce bumper in a first position. The flexible striker cap includes a first surface in contact with the second end in a second position and defines a cavity opposite the first surface. The jounce bumper system further includes an insert received within the cavity.

In another embodiment, a suspension system is provided for a vehicle. The suspension system includes a damper tube coupled to a first portion of the vehicle and including an end, and a jounce bumper system. The jounce bumper system includes a jounce bumper having a first end and a second end. The first end of the jounce bumper coupled to a second, different portion of the vehicle. The jounce bumper system includes a rigid striker cap coupled to the end of the damper tube and having an outer flange spaced apart from a surface. The jounce bumper system also includes a flexible striker cap positioned adjacent to the second end of the jounce bumper and coupled to the outer flange of the rigid striker cap. The jounce bumper system includes an insert positioned between the flexible striker cap and the rigid striker cap.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
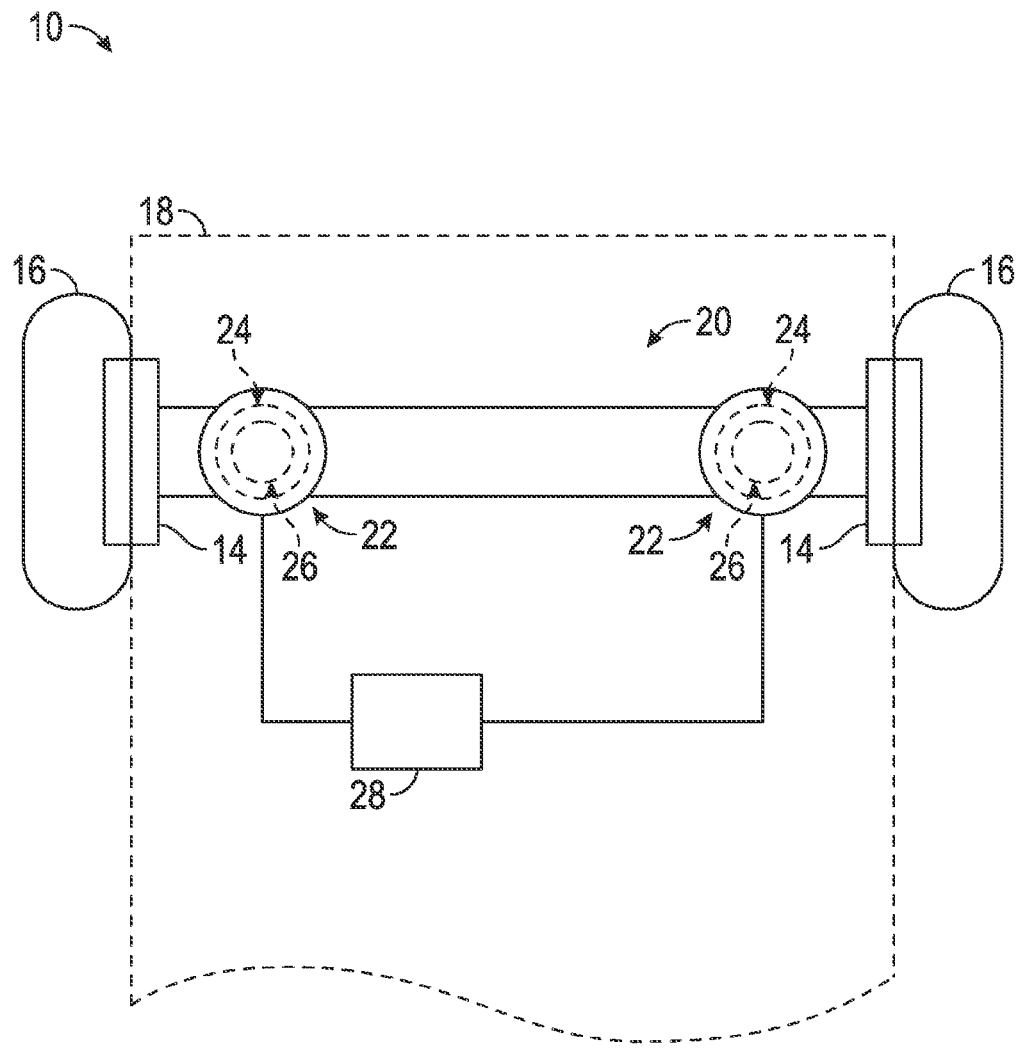
FIG. 1 is a functional block diagram illustrating a vehicle that includes a damper having an insert in accordance with various embodiments.

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. In addition, the same reference numerals may be used to denote the same or similar components.

With reference to FIG. 1, a vehicle 10 is shown including a damper in accordance with various embodiments. Although the figures shown herein depict an example with certain arrangements of elements, additional intervening elements, devices, features, or components may be present in an actual embodiment. It should also be understood that FIG. 1 is merely illustrative and may not be drawn to scale.

The vehicle 10 is shown to include wheels 14, each fitted with a tire 16. The wheels 14 are supported by a vehicle frame 18 via a suspension system shown generally at 20. The suspension system 20 generally includes dampers 22. Although the suspension system 20 is shown to be associated with only two wheels 14 for ease of description (e.g., either front wheels or rear wheels), it is appreciated that the suspension system 20 of the present disclosure is also applicable to a single wheel 14, any pair of wheels 14 or all of the wheels 14 (plus others not shown) of the vehicle 10. As will be discussed in greater detail herein, the dampers 22 includes a jounce bumper system 24 and a damper tube system 26, which can provide energy dissipation and reduction in peak forces experienced by the vehicle frame 18 during an impact event.

In one example, the vehicle 10 also includes a control module 28, which is in communication with a portion of the suspension system 20 to control the activation of a portion of the suspension system 20. For example, the control module 28 can be in communication with one or more of the dampers 22 to activate the dampers 22 in response to one or more sensed conditions associated with the vehicle 10. Thus, the vehicle 10 can include one or more sensors that detect and measure observable conditions of the suspension system 20 and/or the vehicle 10 and generate sensor signals based on the observable conditions. Accordingly, the dampers 22 may actively respond to road surface conditions in real time based on signals received from the control module 28. In alternative embodiments, the dampers 22 may also respond passively to road conditions.

Figure 2:
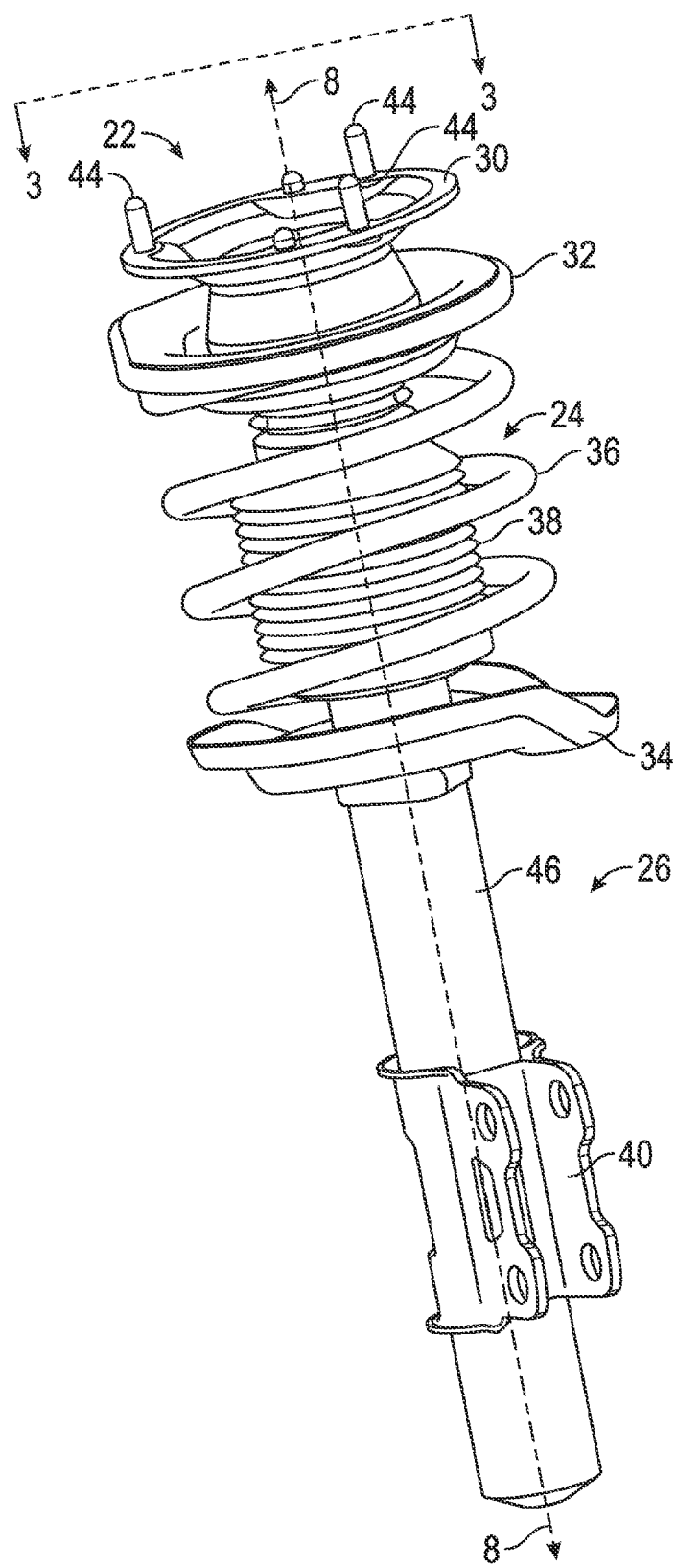
FIG. 2 is a perspective view of the damper of FIG. 1.
Figure 3:
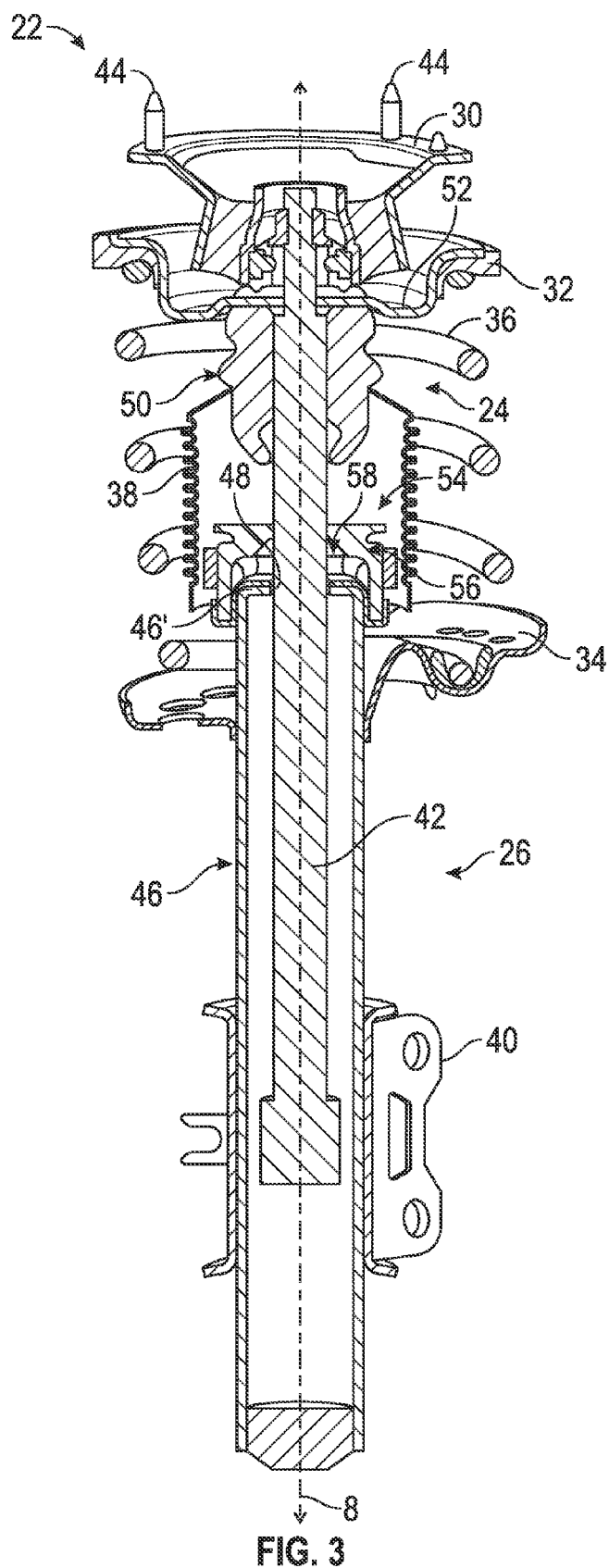
FIG. 3 is a cross-sectional view of the damper of FIG. 2, taken along line 3-3 of FIG. 2, which illustrates a jounce bumper system of the damper in a first position.

With reference to FIGS. 2 and 3, one of the dampers 22 is shown in greater detail. It should be note that while only one damper 22 is illustrated herein, the remaining dampers 22 may be similarly arranged. The damper 22 includes a first or top mounting bracket 30, an upper spring seat 32, a lower spring seat 34, a biasing member or spring 36, a dust tube or dust boot 38, a second or lower mounting bracket 40, a piston rod 42 (FIG. 3), the jounce bumper system 24 (FIG. 3) and the damper tube system 26. It should be noted that the components of the damper 22 illustrated and described herein are merely exemplary, as different vehicle applications may require additional components or a modification of the herein described components.

Generally, the top mounting bracket 30 can be coupled to a portion of the vehicle 10, for example, the vehicle frame 18 using one or more mechanical fasteners 44, as generally known to those skilled in the art. The lower mounting bracket 40 can be coupled to a portion of the vehicle 10, such as a portion of the suspension system 20 using suitable fasteners, including, but not limited to, mechanical fasteners, as known to those skilled in the art.

With reference to FIG. 2, the upper spring seat 32 and lower spring seat 34 cooperate to retain the spring 36. Generally, the upper spring seat 32 is coupled adjacent to the top mounting bracket 30, while the lower spring seat 34 is coupled to the damper tube system 26. The spring 36, in one example, is a coil spring, however, any suitable biasing element can be employed. Generally, the spring 36 is disposed substantially circumferentially about the dust boot 38 and the jounce bumper system 24, and extends along a longitudinal axis 8 of the damper 22. The spring 36 restores the damper 22 to an equilibrium height after an impact event. The dust boot 38 is coupled about the jounce bumper system 24. The dust boot 38 covers and protects the jounce bumper system 24 from debris encountered during the operation of the vehicle 10. The dust boot 38 can have any desired shape, and in one example, is substantially cylindrical. With reference to FIG. 3, the piston rod 42 is axially orientated (substantially parallel to the longitudinal axis 8 of the damper 22), and is coupled to the top mounting bracket 30. The piston rod 42 is slidably coupled to a damper tube 46 of the damper tube system 26 through an opening 48 in a substantially flat upper end 46' of the damper tube 46.

Figure 4:
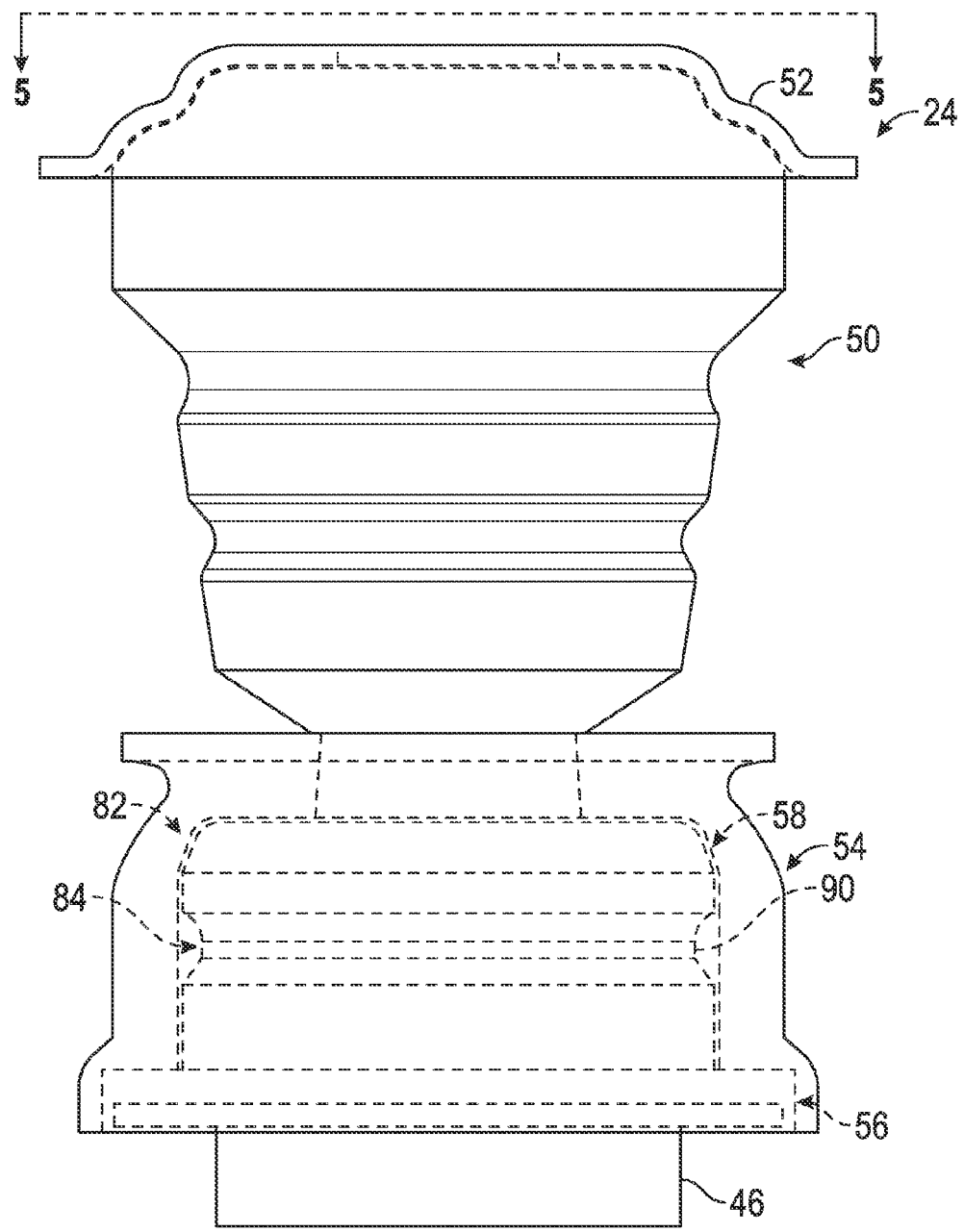
FIG. 4 is a perspective view of the jounce bumper system of the damper of FIG. 2.
Figure 5:
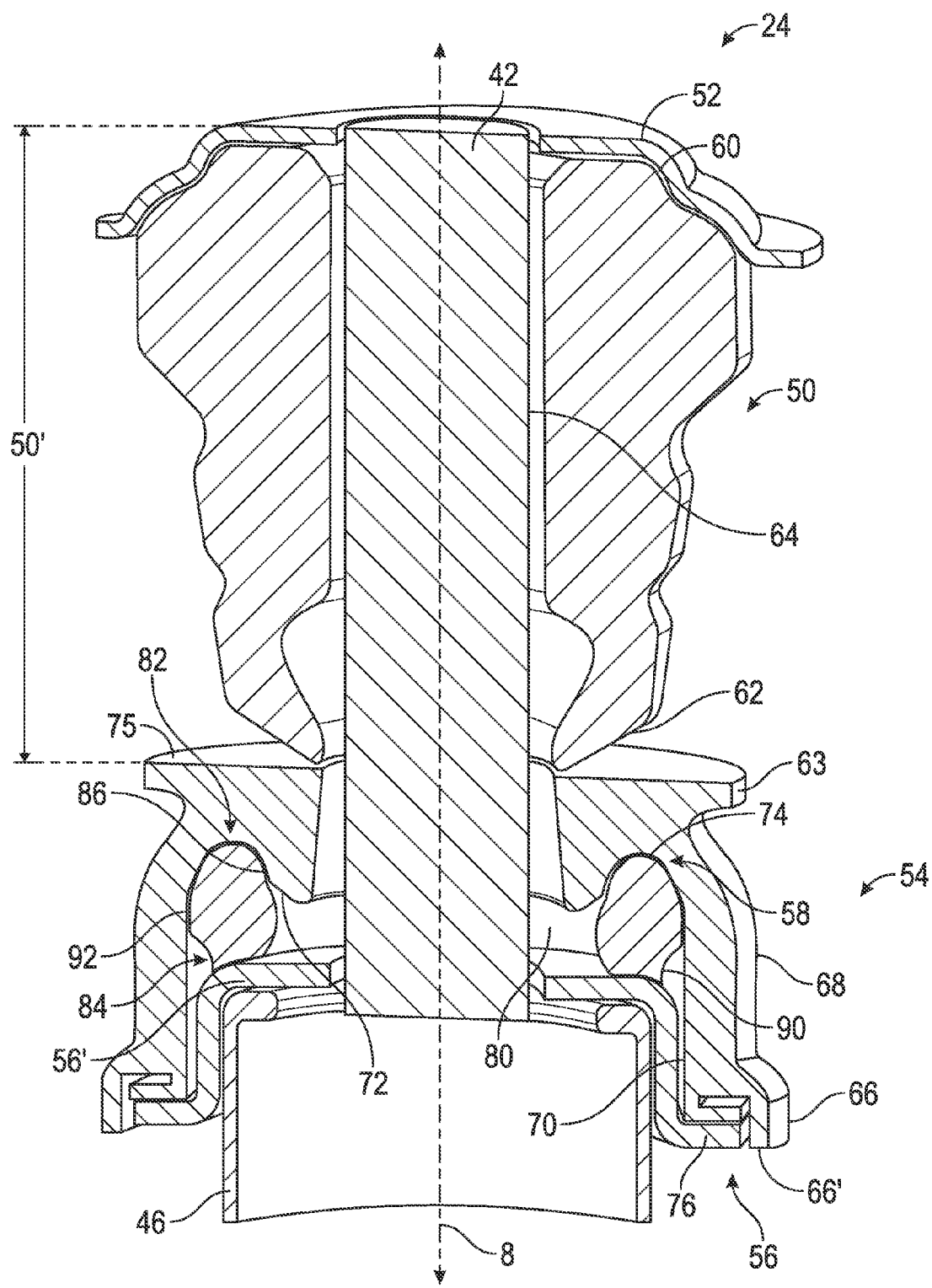
FIG. 5 is a cross-sectional detail view of the jounce bumper system of the damper of FIG. 4, taken along line 5-5 of FIG. 4.

With reference to FIGS. 3 and 4, the jounce bumper system 24 includes a jounce bumper 50, a first or upper mount 52, a flexible striker cap 54, a rigid striker cap 56 and an insert 58. The jounce bumper system 24 assists in absorbing forces experienced by the vehicle 10 during an impact event. The jounce bumper 50 is formed of a suitable energy absorbing material, including, but not limited to, a polyurethane foam rubber. With reference to FIGS. 4 and 5, the jounce bumper 50 is substantially cylindrical, and tapers from a first end 60 to a second end 62. The jounce bumper 50 includes a central bore 64, which extends from the first end 60 to the second end 62. The bore 64 is defined along the longitudinal axis 8, and receives the piston rod 42 therethrough. The first end 60 of the jounce bumper 50 is coupled to the upper mount 52. The upper mount 52 couples the jounce bumper system 24 to the top mounting bracket 30. In addition, the jounce bumper 50 has a height 50', which facilitates the desired amount of energy absorption for the jounce bumper 50. It should be noted, however, that the shape and size of the jounce bumper 50 illustrated and described herein is merely exemplary, and the shape and size of the jounce bumper 50 may vary for different vehicular applications.

The second end 62 of the jounce bumper 50 is adjacent to the flexible striker cap and contacts the flexible striker cap 54 in response to an impact event to absorb energy. Generally, the flexible striker cap 54 comprises any suitable flexible material including, but not limited to, a thermoplastic or thermosetting elastomeric polymer. In one embodiment, flexible striker cap 54 comprises a thermoplastic polyurethane (TPU) foam. The flexible striker cap 54 generally circumscribes and is slidably coupled to piston rod 42. The flexible striker cap 54 includes a substantially planar flange 63 coupled to an annular base portion 66 via a sidewall 68. The flange 63, sidewall 68 and base portion 66 cooperate to define an interior cavity 70, such the flexible striker cap 54 has a substantially U-shaped cross section. The cavity 70 is sized such that the flexible striker cap 54 fits over and about the rigid striker cap 56, with the insert 58 received between a first, interior side 72 of the flange 63 and a surface 56' of the rigid striker cap 56. In one example, the interior side 72 of the flange 63 includes a groove 74, which receives the insert 58.

A second, exterior side 75 of the flange 63 engages the jounce bumper 50 during impact events. An end of the base portion 66 includes a lip 66', which overlaps an outer flange 76 of the rigid striker cap 56. The overlap between the base portion 66 and the outer flange 76 serves as a mount for flexible striker cap 54 on the rigid striker cap 56, and thus, the damper tube 46.

The rigid striker cap 56 may comprise any suitable structurally rigid material such as any steel alloy including stainless steel. The rigid striker cap 56 is conformably coupled to the upper end 46' of the damper tube 46 and moves axially in unison therewith, and has an opening for slidable coupling to the piston rod 42.

The insert 58 is coupled to the flexible striker cap 54, so as to be disposed in the groove 74 of the cavity 70. In one example, the insert 58 may be press-fit into the groove 74 of the cavity 70 to couple the insert 58 to the flexible striker cap 54. The insert 58 is substantially annular, and defines an opening 80 that extends along the longitudinal axis 8 of the damper 22. The insert 58 comprises any suitable resilient, energy absorbing or damping material, including, but not limited to, polyurethane foam rubber. The insert 58 includes a first end 82 and a second end 84, with the opening 80 extending through the insert 58 from the first end 82 to the second end 84. In one example, the opening 80 has a diameter that ranges from about 36 millimeters to about 38 millimeters. Generally, the insert 58 has a thickness that ranges from about 20 millimeters to about 22 millimeters. It should be noted that these dimensions of the insert 58 are merely exemplary, as the insert 58 may have any suitable shape and dimension necessary for a given vehicular application.

The first end 82 of the insert 58 includes a notch 86. The notch 86 is generally defined adjacent to an inner surface 88 of the insert 58, and in one example, extends about a periphery or circumference of the opening 80. The notch 86 cooperates with the groove 74 to couple or secure the insert 58 within the flexible striker cap 54. The second end 84 of the insert 58 includes a recess 90. The recess 90 is defined on an outer surface 92 of the insert 58 and generally extends about a periphery or circumference of the insert 58. The recess 90 is generally concave, however, the recess 90 can have any desired shape. The recess 90 provides additional clearance for the deformation of the insert 58 during an impact event.

Generally, during an impact event, the insert 58 deforms to fill the cavity 70 of the flexible striker cap 54 to enable the jounce bumper system 24 to absorb additional energy. In addition, the insert 58 improves the durability of the flexible striker cap 54 by reinforcing the flexible striker cap 54 during an impact event, thereby reducing the strain on the flexible striker cap 54 during an impact event. In one example, the addition of the insert 58 in the jounce bumper system 24 was shown to improve energy absorption of the jounce bumper system 24 by about 20% when compared to a jounce bumper system without an insert 58. Generally, the insert 58 absorbs about 50 Joules (J) of energy during an impact event, thereby increasing the energy absorption of the damper 22 by about 50 J.

With reference back to FIG. 3, the damper tube system 26 includes the piston rod 42 and the damper tube 46. Generally, the damper tube 46 includes a predetermined amount of a suitable fluid, such as a hydraulic fluid, which can be moved or compressed by the piston rod 42 to absorb and/or dissipate energy during the operation of the vehicle 10.

Figure 6:
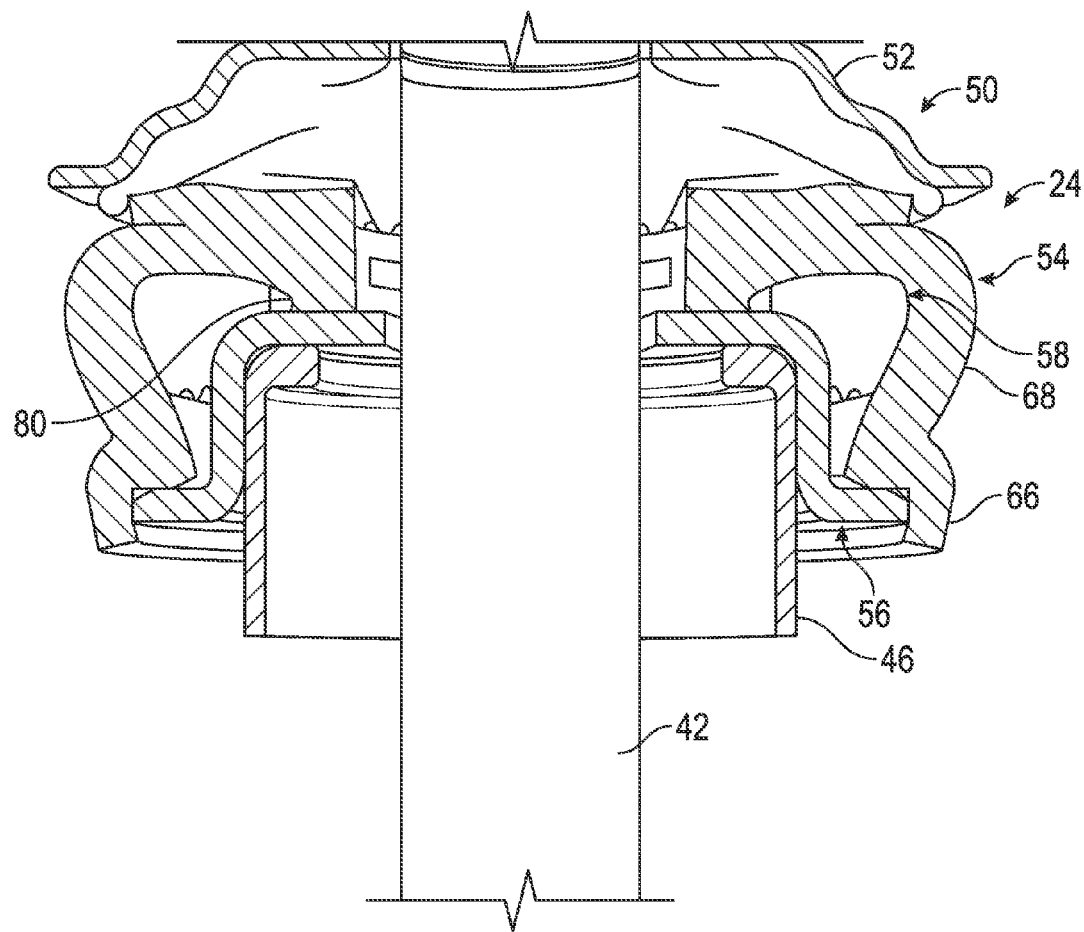
FIG. 6 is a schematic cross-sectional illustration of the jounce bumper system of the damper of FIG. 4, taken along line 5-5 of FIG. 4, in a second position.

During operation, with reference to FIG. 3, the piston rod 42 oscillates in and out of the damper tube 46 in a well-known manner to dampen relative motion between connecting suspension members. The spring 36 also compresses and expands resiliently in concert with these oscillations. During normal driving conditions that do not produce excessive jounce, the second end 62 of the jounce bumper 50 and the second, exterior side 75 of the flange 63 of flexible striker cap 54 are in a first position, and remain separated by a distance that varies in accordance with the relative motion between the piston rod 42 and the damper tube 46, as illustrated in FIG. 3. In a second position, during an impact event characterized by excessive jounce, the second end 62 of the jounce bumper 50 and the flexible striker cap 54 contact and deformably engage, absorbing at least part of the energy generated by the impact. This contractive motion may continue accompanied by additional deformation of the insert 58 until the jounce bumper 50, the insert 58 and the flexible striker cap 54 each reach a maximum axial deformation, as illustrated in FIG. 6. For severe impact events wherein such maximum deformation is achieved, further jounce motion is prevented by the rigidity of the upper mount 52 and the rigid striker cap 56. The overlapping of the base portion 66 with the outer flange 76 of the rigid striker cap 56 reduces the overall stack height or vertical space required by the flexible striker cap 54 enabling greater energy absorption per unit volume.

The insert 58 stabilizes the amount of strain experienced by the flexible striker cap 54 by controlling the shape of the flexible striker cap 54 during deformation caused by jounce events. The insert 58 also increases the energy absorption capabilities of the flexible striker cap 54 by at least about 50 Joules (J). This results in increased durability and increased performance of the flexible striker cap 54.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A jounce bumper system for use with a damper, comprising:
   a first mount;
   a jounce bumper having a first end coupled to the first mount and a second end;
   a flexible striker cap spaced apart from the second end of the jounce bumper in a first position, the flexible striker cap including a first surface in contact with the second end in a second position and defining a cavity opposite the first surface; and
   an insert received within the cavity,
   wherein the insert is composed of polyurethane foam rubber.

2. The jounce bumper system of claim 1, wherein the insert is substantially annular.

3. The jounce bumper system of claim 1, wherein the flexible striker cap is disposed about a portion of the damper, and the insert is received in the cavity so as to be positioned between the flexible striker cap and the portion of the damper.

4. The jounce bumper system of claim 1, wherein the insert is composed of a resilient material.

5. The jounce bumper system of claim 1, wherein the insert includes a first end opposite a second end, with an opening extending through the insert from the first end to the second end, and the first end includes a notch defined about a periphery of the opening of the insert that cooperates with the cavity of the flexible striker cap to couple the insert to the flexible striker cap.

6. The jounce bumper system of claim 5, wherein the insert is coupled to the flexible striker cap through a press-fit.

7. The jounce bumper system of claim 5, wherein the second end of the insert further comprises a recess defined about a periphery of the second end of the insert.

8. A damper for a vehicle, comprising:
   a jounce bumper having a first end and a second end;
   a flexible striker cap spaced apart from the second end of the jounce bumper in a first position, the flexible striker cap including a flange in contact with the second end of the jounce bumper in a second position and a base portion that defines a cavity;
   a rigid striker cap to be coupled to a damper tube associated with the damper, an end of the base portion of the flexible striker cap coupled to the rigid striker cap; and an insert received within the cavity of the flexible striker cap so as to be positioned between the flexible striker cap and the rigid striker cap.

9. The damper of claim 8, further comprising a damper tube and a piston rod slidable within the damper tube, the rigid striker cap coupled to an end of the damper tube and including an opening for slidably receiving the piston rod, and the slidable movement of the piston rod moves the jounce bumper relative to the flexible striker cap from the first position to the second position.

10. The damper of claim 9, wherein the damper further comprises:
   a first mount coupled to the first end of the jounce bumper;
   an upper mounting bracket to couple the damper to a portion of the vehicle, with the first mount and the piston rod coupled to the upper mounting bracket; and
   a lower mounting bracket to couple the damper to a suspension system of the vehicle,
   wherein the jounce bumper defines a second opening from the first end to the second end for receiving the piston rod.

11. The damper of claim 9, wherein the insert is substantially annular and defines a fourth opening for slidably receiving the piston rod.

12. The damper of claim 11, wherein the insert includes a first end opposite a second end, and the first end of the insert includes a notch defined about a periphery of the fourth opening of the insert.

13. The damper of claim 12, wherein the cavity of the flexible striker cap includes a groove that receives the notch of the insert to couple the insert to the flexible striker cap.

14. The damper of claim 12, wherein the second end of the insert further comprises a recess defined about a periphery of the second end of the insert.

15. The damper of claim 8, wherein the flexible striker cap defines a third opening through the flange for slidably receiving the piston rod, and the end of the base portion overlaps the rigid striker cap to couple the flexible striker cap to the rigid striker cap.

16. The damper of claim 8, wherein the insert is composed of polyurethane foam rubber.

17. The damper of claim 8, wherein the insert is composed of polyurethane foam rubber.

18. A suspension system for a vehicle, comprising:
   a damper tube coupled to a first portion of the vehicle and including an end; and
   a jounce bumper system including:
      a jounce bumper having a first end and a second end, the first end coupled to a second, different portion of the vehicle;
      a rigid striker cap coupled to the end of the damper tube and having an outer flange spaced apart from a surface;
      a flexible striker cap positioned adjacent to the second end of the jounce bumper and coupled to the outer flange of the rigid striker cap; and
      an insert positioned between the flexible striker cap and the rigid striker cap.

19. The suspension system of claim 18, wherein the insert is substantially annular and is composed of a resilient material.

* * * * *